(12) United States Patent
Suk et al.

(10) Patent No.: US 9,274,214 B2
(45) Date of Patent: Mar. 1, 2016

(54) APPARATUS FOR CONTROLLING DRIVING OF LIGHTING-EMITTING DIODE AND METHOD OF PROVIDING CONTROL SIGNAL THEREOF

(71) Applicant: Electronics and Telecommunications Research Institute, Daejeon (KR)

(72) Inventors: Jung Hee Suk, Daejeon (KR); Chun-Gi Lyuh, Daejeon (KR); Young-deuk Jeon, Daejeon (KR); Tae Moon Roh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/321,725

(22) Filed: Jul. 1, 2014

(65) Prior Publication Data

US 2015/0091445 A1    Apr. 2, 2015

(30) Foreign Application Priority Data

Sep. 30, 2013  (KR) .................. 10-2013-0116596
Jan. 16, 2014  (KR) .................. 10-2014-0005666

(51) Int. Cl.
*H05B 33/08*  (2006.01)
*G01S 7/484*  (2006.01)
*G01S 17/58*  (2006.01)
*G01S 7/481*  (2006.01)

(52) U.S. Cl.
CPC ............... *G01S 7/484* (2013.01); *G01S 7/4815* (2013.01); *G01S 17/58* (2013.01)

(58) Field of Classification Search
CPC ....... H05B 33/0842; G01S 7/58; G01S 7/484; G01S 7/4815
USPC .......................................... 315/153, 149, 155
See application file for complete search history.

(56) References Cited

U.S. PATENT DOCUMENTS

| 2008/0079568 | A1* | 4/2008 | Primous | ............. H05B 37/0218 340/541 |
| 2011/0193491 | A1* | 8/2011 | Choutov | ............ H05B 33/0803 315/291 |
| 2015/0002028 | A1* | 1/2015 | Chen | .................... H05B 39/041 315/153 |

FOREIGN PATENT DOCUMENTS

| KR | 10-2009-0093220 A | 9/2009 |
| KR | 10-2009-0117586 A | 11/2009 |

* cited by examiner

*Primary Examiner* — Daniel D Chang (57) ABSTRACT

The control apparatus of the present invention determines a motion state of an object and provides an IRLED switching control signal suitable for the motion state in an apparatus for sensing/recognizing a motion of the object by using an infrared light-emitting diode (IRLED) and a photodiode (PD). Such a control apparatus is an LED driving control apparatus, and includes a motion velocity generating unit, a previous section average value generating unit, a state value generating unit, a control unit, and an LED switching control signal generating unit.

16 Claims, 12 Drawing Sheets

APPARATUS FOR CONTROLLING DRIVING OF LIGHTING-EMITTING DIODE AND METHOD OF PROVIDING CONTROL SIGNAL THEREOF

CROSS-REFERENCE TO RELATED APPLICATIONS

This U.S. non-provisional patent application claims priority under 35 U.S.C. §119 to Korean Patent Application Nos. 10-2013-0116596, filed on Sep. 30, 2013, and 10-2014-0005666, filed on Jan. 16, 2014, the entire contents of which are hereby incorporated by reference.

BACKGROUND OF THE INVENTION

The present invention disclosed herein relates to a driving controlling apparatus, and more particularly, to an apparatus for controlling the driving of a light-emitting diode (LED) that operates an infrared LED (IRLED) more efficiently in an apparatus sensing and recognizing the motion of an object by using the IRLED and a photodiode (PD), and a method of providing a control signal thereof.

A typical motion sensing/recognizing technology has mainly used a method of using an imaging camera. However, since a method of using an image camera on a mobile terminal involves a lot of consumption power, a method of using an IRLED and a PD is being recently preferred.

In the latter case, emitting an infrared ray is performed through the IRLED. When there is an object, an infrared ray reflected from the object is received through the PD. If the amount of the reflected infrared ray is measured, it may be sensed that the object approaches, or a direction in which the object moves may be recognized.

When the above method is implemented, the IRLED is regularly switched irrespective of the motion of the object. When the method of switching the IRLED is inefficient, there is a limitation in that consumption power increases.

SUMMARY OF THE INVENTION

The present invention provides an apparatus for controlling the driving of a light-emitting diode that may decrease or minimize the consumption power of an IRLED, and a method of providing a control signal of the apparatus.

Embodiments of the present invention provide apparatuses for controlling the driving of a light-emitting diode (LED) including: a motion velocity generating unit receiving an input signal to generate a motion velocity signal; a previous section average value generating unit comparing input signals received in previous sections to generate a previous section average value; a state value generating unit generating a motion state value for the input signal based on the previous section average value and settings for determination of a motion state of the object; a control unit applying the settings to the state value generating unit, wherein the control unit receives the motion velocity signal and the motion state value and generates a frequency value of a switching control signal; and an LED switching control signal generating unit generating an LED switching control signal in response to the frequency value of the switching control signal, wherein the LED switching control signal generating unit applies a generated signal to a driving unit driving an LED.

In some embodiments, the input signal may be one or more photodiode (PD) signals.

In other embodiments, the control unit may include: a setting register unit storing frequency information, velocity information, and time information as settings for determination of the motion state of the object; a variable state frequency generator generating a variable state frequency for the motion velocity of the object according to the frequency information and the velocity information applied from the setting register unit; a constant state frequency generator receiving frequency information related to a constant state from the setting register unit in a constant state frequency generating mode and generating a constant state frequency; and a multiplexer outputting the variable state frequency or the constant state frequency as the frequency value of the switching control signal according to the motion state value.

In still other embodiments, the multiplexer may further output a standby state frequency provided from the setting register unit as the frequency value of the switching control signal according to the motion state value.

In even other embodiments, the state value generating unit may include: a state determination threshold generating unit receiving the previous section average value applied from the previous section average value generating unit and a state determination threshold ratio applied from the control unit in a state determination threshold generating mode and generating maximum and minimum state determination thresholds; and a state determination unit determining a motion state on the input signal with reference to the time information and minimum state determination threshold applied from the control unit and generating a corresponding motion state value.

In yet other embodiments, the apparatuses may further include a filter unit removing noise from the input signal, wherein the filter unit may be installed before the motion velocity generating unit and the previous section average value generating unit.

In further embodiments, the LED switching control signal may have different ON/OFF periods in a standby state and a motion sensing state.

In still further embodiments, the ON/OFF period in the motion sensing state may be shorter than the ON/OFF period in the standby state.

In even further embodiments, the ON/OFF period in the motion sensing state may vary depending on a motion state of the object.

In other embodiments of the present invention, methods of providing a signal for controlling the driving of an LED include receiving an input signal, generating a motion velocity signal of an object, comparing input signals received in previous sections and generating a previous section average value; generating a motion state value for the input signal according to the previous section average value and settings for determination of a motion state of the object; using the motion velocity signal and the motion state value to generate a frequency value of a switching control signal; generating an LED switching control signal according to the frequency value of the switching control signal and applying a generated signal to an LED driving unit.

In some embodiments, the input signal may be a signal received through a plurality of PDs.

In other embodiments, the methods may further include filtering noise out of the input signal before generating the motion state value.

In still other embodiments, the LED switching control signal may have different frequencies in a standby state and a motion sensing state.

In even other embodiments, a frequency in the motion sensing state may be higher than a frequency in the standby state.

In yet other embodiments, a frequency in the motion sensing state may vary depending on a motion state of the object.

In further embodiments, the settings may include frequency information, velocity information, and time information.

In still other embodiments of the present invention, apparatuses for sensing and recognizing a motion, the apparatus include a PD array unit receiving an infrared ray reflected from the object and generating a current signal according to the received amount of the infrared ray; a PD signal processing unit processing the current signal and generating a PD signal value being represented as digital data; a motion sensing and recognizing unit using the PD signal value to recognize the approach or travel direction of the object; an LED driving unit driving the IRLED array unit in response to an applied switching control signal; and an IRLED control unit using the PD signal value to generate a switching control signal according to a motion level of the object.

In some embodiments, the LED driving unit may include a motion velocity generating unit receiving the PD signal value as an input signal and generating a motion velocity signal of an object; a previous section average value generating unit comparing input signals received in previous sections and generating a previous section average value; a state value generating unit generating a motion state value for the input signal based on the previous section average value and settings for determination of a motion state of the object; a control unit applying the settings to the state value generating unit, wherein the control unit may receive the motion velocity signal and the motion state value and generate a frequency value of the switching control signal; and an LED switching control signal generating unit generating the LED switching control signal in response to the frequency value of the switching control signal.

In other embodiments, a frequency of the LED switching control signal in a motion sensing state of the object may be higher than a frequency in a standby state of the object.

In still other embodiments, a frequency of the LED switching control signal may vary depending on a motion state of the object.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Exemplary embodiments of the present invention are described below in detail with reference to the accompanying drawings. It should be noted that only descriptions required for understanding operations according to various embodiments of the present invention are provided below and other descriptions are not provided in order not to obscure the subject matter of the present invention.

Figure 1:
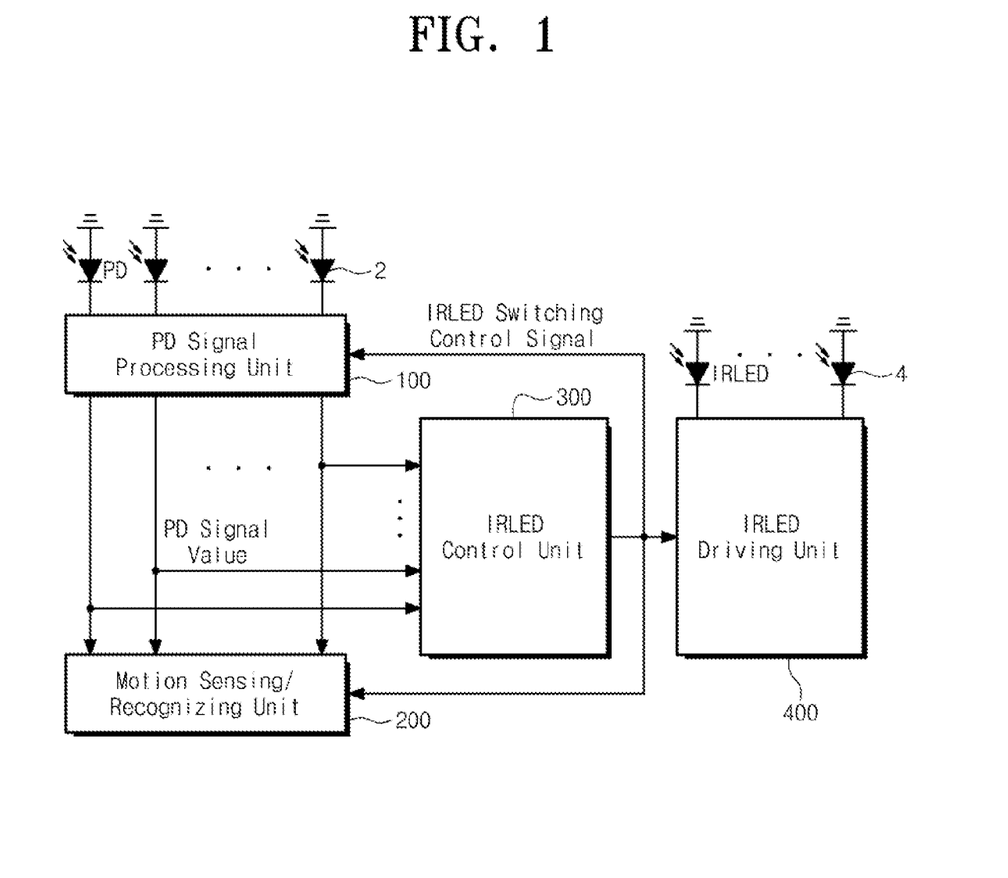
FIG. 1 is an exemplary block of a motion sensing/recognizing apparatus to which the present invention is applied.

FIG. 1 is an exemplary block of a motion sensing/recognizing apparatus to which the present invention is applied.

Referring to FIG. 1, the motion sensing and recognizing apparatus includes an infrared light-emitting diode (IRLED) array unit 4, a photodiode (PD) array unit 2, a photodiode signal processing unit 100, a motion sensing and recognizing unit 200, an LED driving unit 400, and an IRLED control unit 300.

The IRLED array unit 4 radiates an infrared ray to an object. The IRLED array unit 4 may include one or more IRLEDs.

The PD array unit 2 receives an infrared ray reflected from the object and generates a current signal according to the received amount of the infrared ray. The PD array unit 2 may include one or more PDs.

The PD signal processing unit 100 processes the current signal and generates a PD signal value that is represented as digital data. The PD signal processing unit 100 may include a circuit device that converts a current signal into a voltage and then amplifies the voltage, an ambient light removing device, and an analog-digital (AD) converter that converts an amplified voltage into digital data.

The motion sensing and recognizing unit 200 uses the PD signal value to recognize the approach or travel direction of the object.

The PD driving unit 400 drives the IRLED array unit 4 in response to an applied switching control signal. The IRLED driving unit 400 may include a current/voltage generating device that switches the IRLED array unit 4.

The IRLED control unit 300 uses the PD signal value to generate a switching control signal according to the motion level of the object.

The IRLED control unit 300 in the motion sensing and recognizing apparatus functions as an LED driving control device in an embodiment of the present invention.

The LED driving control device is included in an apparatus for sensing and recognizing the motion of an object by using an IRLED and a PD, determines the motion state of the object and generates a frequency value of an IRLED switching control signal suitable for the motion state.

Figure 2:
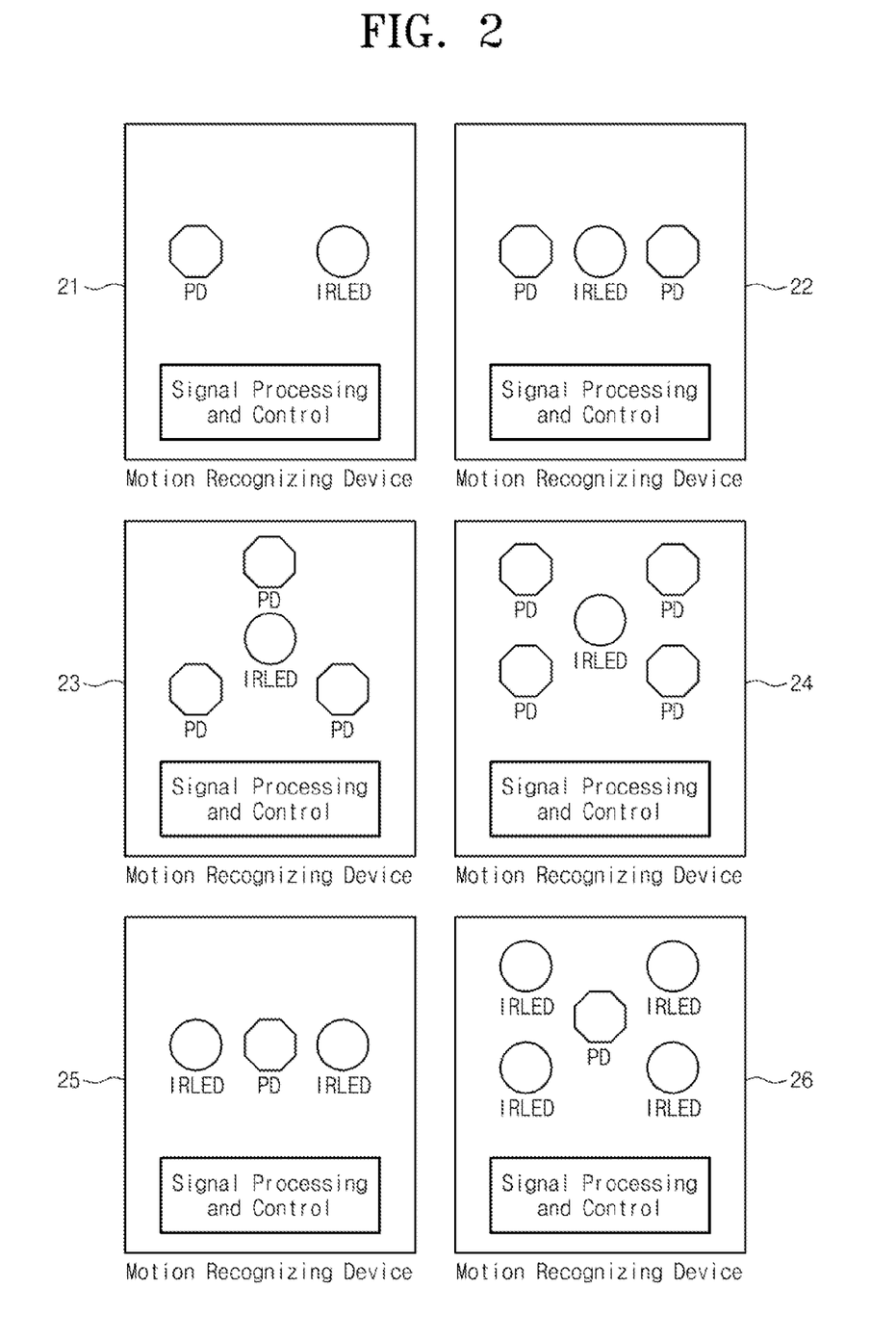
FIG. 2 illustrates various exemplary arrangements of an IRLED and a PD in the motion sensing/recognizing apparatus of FIG. 1.

FIG. 2 illustrates various exemplary arrangements of an IRLED and a PD in the motion sensing/recognizing apparatus of FIG. 1. In this example, the IRLED and the PD may be arranged in various forms in consideration of a use and a required function. An arrangement in which the IRLED faces the PD is represented by reference numeral 21 of FIG. 2. An arrangement in which there is an IRLED between two PDs is represented by reference numeral 22 of FIG. 2. An arrangement in which an IRLED is surrounded by a plurality of PDs installed in a triangular structure is represented by reference numeral 23 of FIG. 2.

An arrangement in which an IRLED is surrounded by a plurality of PDs installed in a quadrilateral structure is represented by reference numeral 24 of FIG. 2. An arrangement in which there is a PD between a plurality of IRLEDs installed in a linear structure is represented by reference numeral 25 of FIG. 2.

An arrangement in which a PD is surrounded by a plurality of IRLEDs installed in a quadrilateral structure is represented by reference numeral 26 of FIG. 2.

In order to sense and recognize the motion of an object by using the IRLED and the PD as shown in FIG. 2, controlling the driving of the IRLED by using an IRLED switching control signal is needed so that the IRLED may emit a light.

Figure 3:
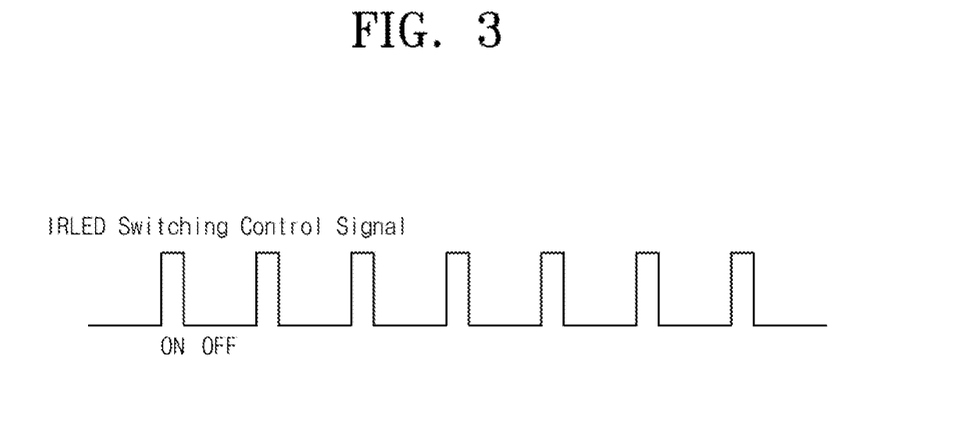
FIG. 3 is an exemplary waveform diagram of a typical IRLED switching control signal.

FIG. 3 is an exemplary waveform diagram of a typical IRLED switching control signal.

The switching control signal of FIG. 3 is a pulse signal that has a relatively short ON section and a relatively long OFF section. When an IRLED continues to emit a light, consumption power increases. Thus, the switching control signal is provided in the form of a pulse signal that regularly has an ON/OFF section like a waveform signal of FIG. 3.

When the IRLED emits a light in the ON section, an infrared ray reflected from an object is applied to a PD. The PD generates a current signal according to the amount of the infrared ray. A PD signal value being represented through the current signal is used for detecting the motion of the object. A frequency of the switching control signal of FIG. 3 is determined in consideration of the maximum velocity of the motion of the object to be recognized. That is, the frequency of the switching control signal of the IRLED is determined within a range that does not affect recognition. However, the switching control signal having a certain period as in FIG. 3 is disadvantageous to the consumption power aspect of the IRLED. That is, the reason for this is because the IRLED emits a light at a relatively high switching frequency even though the motion velocity of the object is slow or there is no object. As a result, since the switching control signal of the IRLED is generated at a constant frequency irrespective of the motion level of the object, the frequent driving of the IRLED is caused even though the velocity of the object is slow or there is no object, so a waste of power is incurred.

Figure 4:
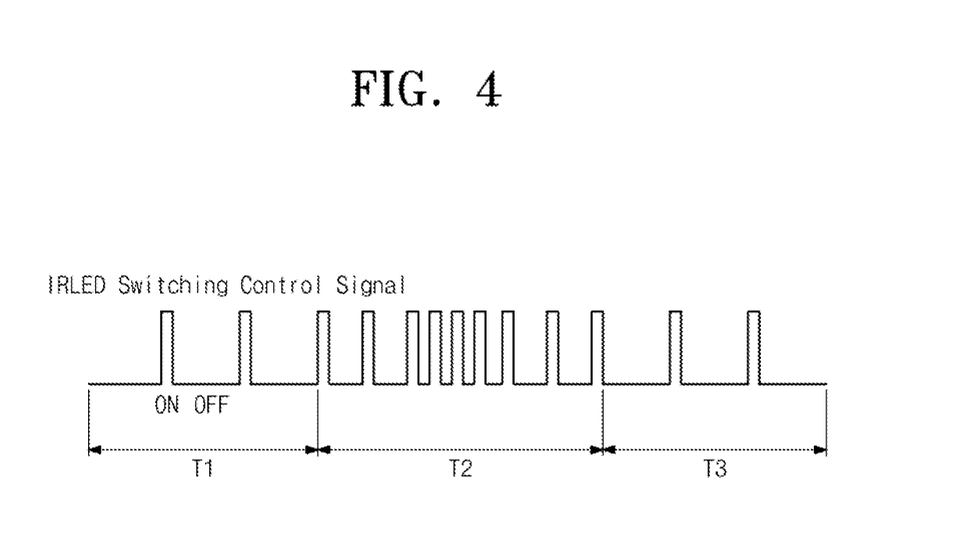
FIG. 4 is an exemplary waveform diagram of an IRLED switching control signal according to an embodiment of the present invention.

FIG. 4 is an exemplary waveform diagram of an IRLED switching control signal according to an embodiment of the present invention.

FIG. 4 shows an IRLED switching control signal that has different frequencies in sections T1 to T3, respectively.

The sections T1 and T3 are standby state sections. The section T2 is a motion state section. Even though there is a motion state, the frequency of the IRLED switching control signal varies depending on the motion level or state of an object. That is, the frequency of the IRLED switching control signal even in the section T2 is variable. According to such an IRLED switching control signal, there is an advantage of minimizing or decreasing power to be consumed for the driving of an IRLED while increasing accuracy in sensing and recognition.

The IRLED switching control signal is generated by a LED driving control device that is the IRLED control unit 300.

Figure 5:
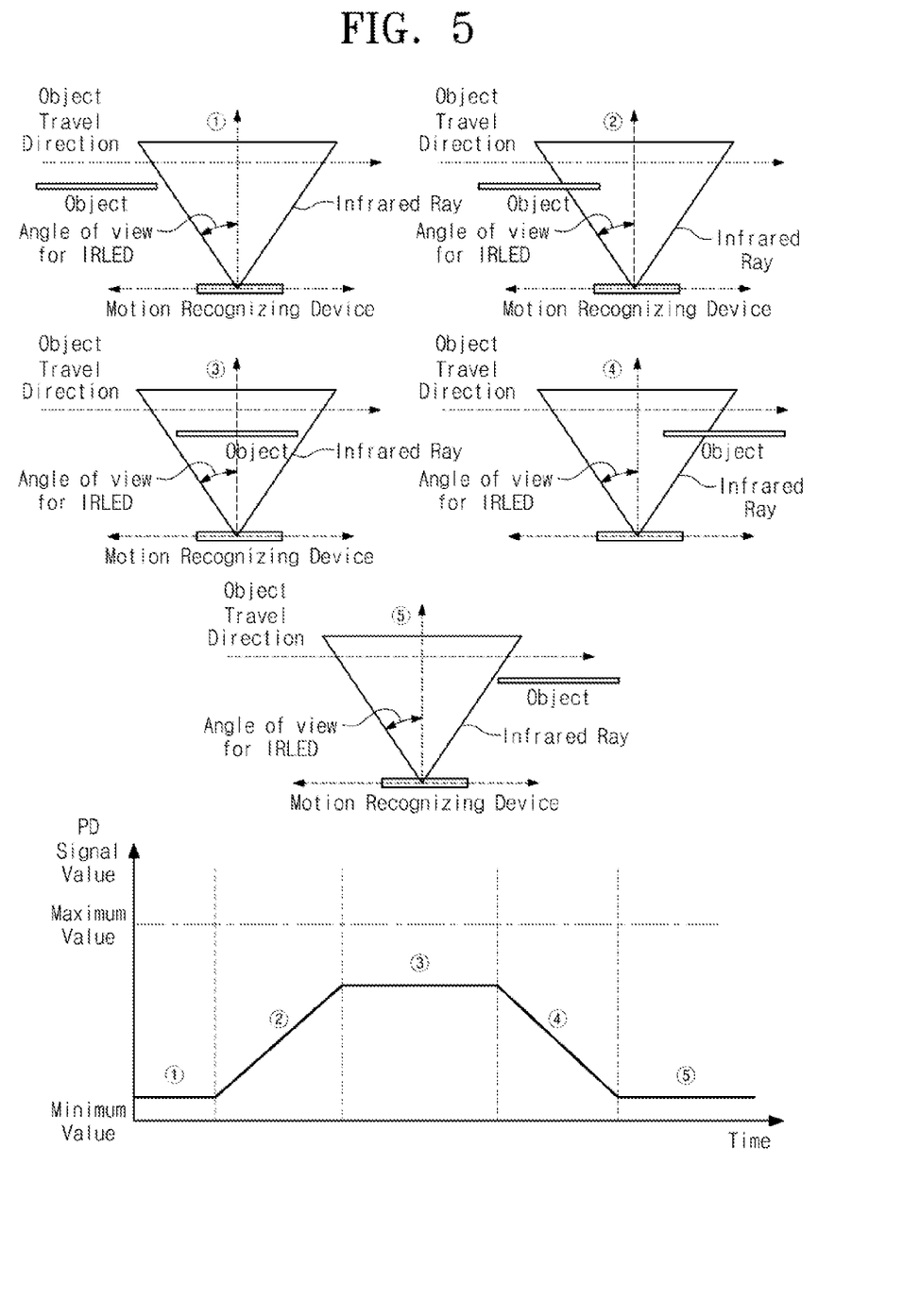
FIG. 5 illustrates an output signal value of a PD according to a time and the location of a moving object in the apparatus of FIG. 1.

FIG. 5 illustrates an output signal value of a PD according to a time and the location of a moving object in the apparatus of FIG. 1.

Referring to FIG. 5, in the case ① that an object is outside a range within which an IRLED emits an infrared ray, a PD signal value is output as a relatively low value excluding a minimum value '0' due to the entry and reflection of an external light and an offset generating in a PD signal processing unit.

In the case ② that the object moves and enters a range within which the IRLED emits the infrared ray, the amount of the infrared ray reflected from a PD increases and the PD signal value also increases. In this case, the variation in the PD signal value also increases in proportion to the motion velocity of the object.

In the case ③ that there is no variation in radiation even though the object in the state ② further enters the range within which the IRLED emits the infrared ray, the PD signal value maintains a constant output.

In the case ④ that the object moves and begins to leave the range within which the IRLED emits the infrared ray, the amount of the infrared ray reflected from a PD decreases and the PD signal value also decreases.

In the case ⑤ that the object completely leaves the range within which the IRLED emits the infrared ray, a low value is output as in the case ①.

The graph shown in the lower part of FIG. 5 shows a result corresponding to five cases as described above. The horizontal axis of the graph represents a time and the vertical axis represents a PD signal value.

Figure 6:
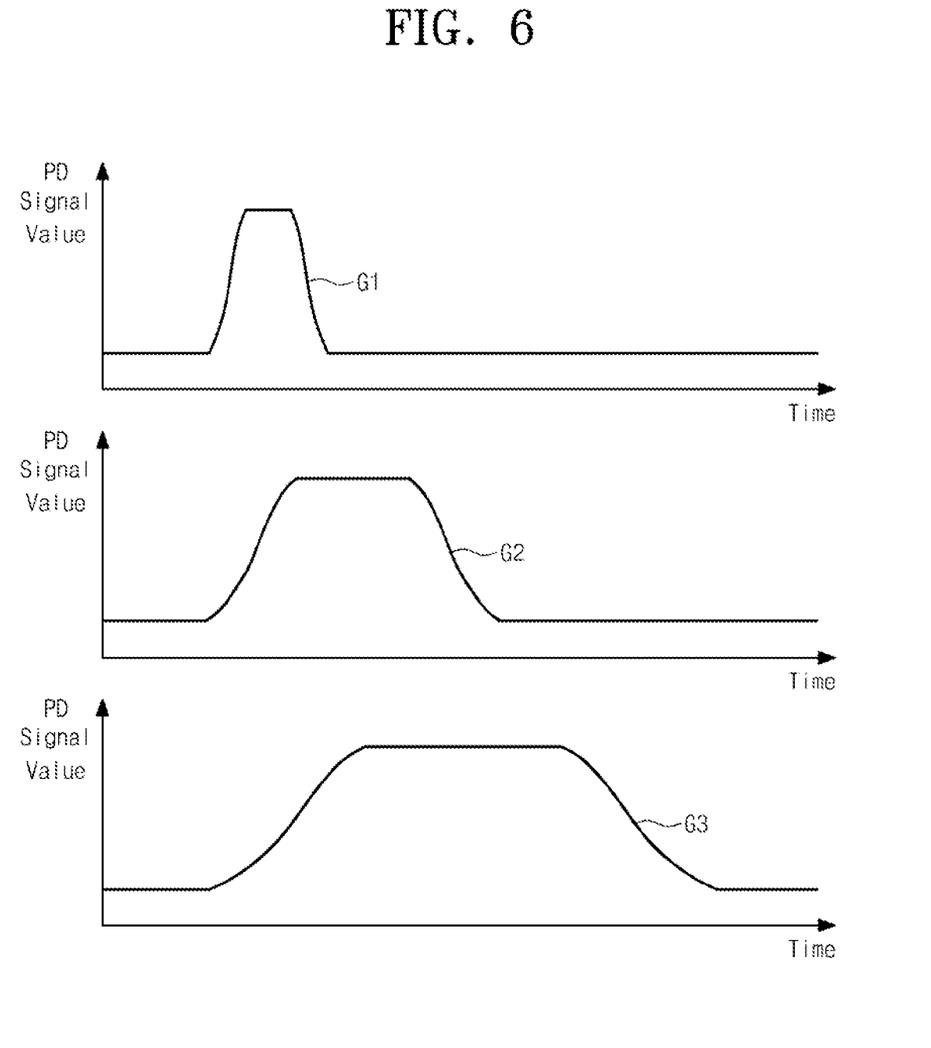
FIG. 6 illustrates graphs of time vs. output signal value of a PD according to a moving velocity of an object in the apparatus of FIG. 1.

FIG. 6 illustrates graphs of time vs. output signal value of a PD according to a moving velocity of an object in the apparatus of FIG. 1.

FIG. 6 show graphs G1 to G3 for three cases regarding to the moving velocity of an object. On each of the graphs, the horizontal axis represents a time and the vertical axis represents a PD signal value.

When it is assumed by using the graph G2 that the object moves at an intermediate velocity, the graph G1 represents a high-velocity case and the graph G3 represents a low-velocity case.

Even though the object is in a range within which an IRLED emits an infrared ray as in the case ③ of FIG. 5, there is a section in which a PD signal value is uniformly maintained. In this case, since the variation in PD signal value is small, there is no need to make the frequency of an IRLED switching control signal relatively high. On the other hand, in the cases ② and ④ where the variation in the PD signal value is great, there is a need to make the frequency of an IRLED switching control signal high. The reason for this is because there is a need to more precisely measure the variation in the PD signal value for the slight motion of an object in order to increase the accuracy of sensing and recognition related to a motion. Since the accuracy of sensing and recognition is also affected by the motion velocity of the object, there is a need to make the frequency of the IRLED switching control signal high as the variation in the PD signal value increases. On the contrary, in the cases ①, ③ and ⑤ where the variation in the PD signal value is slight, there is no big problem with recognition even if the frequency of the IRLED switching control signal is lowered.

According to an embodiment of the present invention, the motion state and motion velocity of the object are determined and generated through the PD signal value. The frequency of the IRLED switching control signal is adjusted to be optimized for the motion state and velocity of the object. As a result, since a switching control signal is generated by an LED driving control unit that is the IRLED control unit 300 as shown in FIG. 7, consumption power decreases and the accuracy of sensing and recognition increases.

Figure 7:
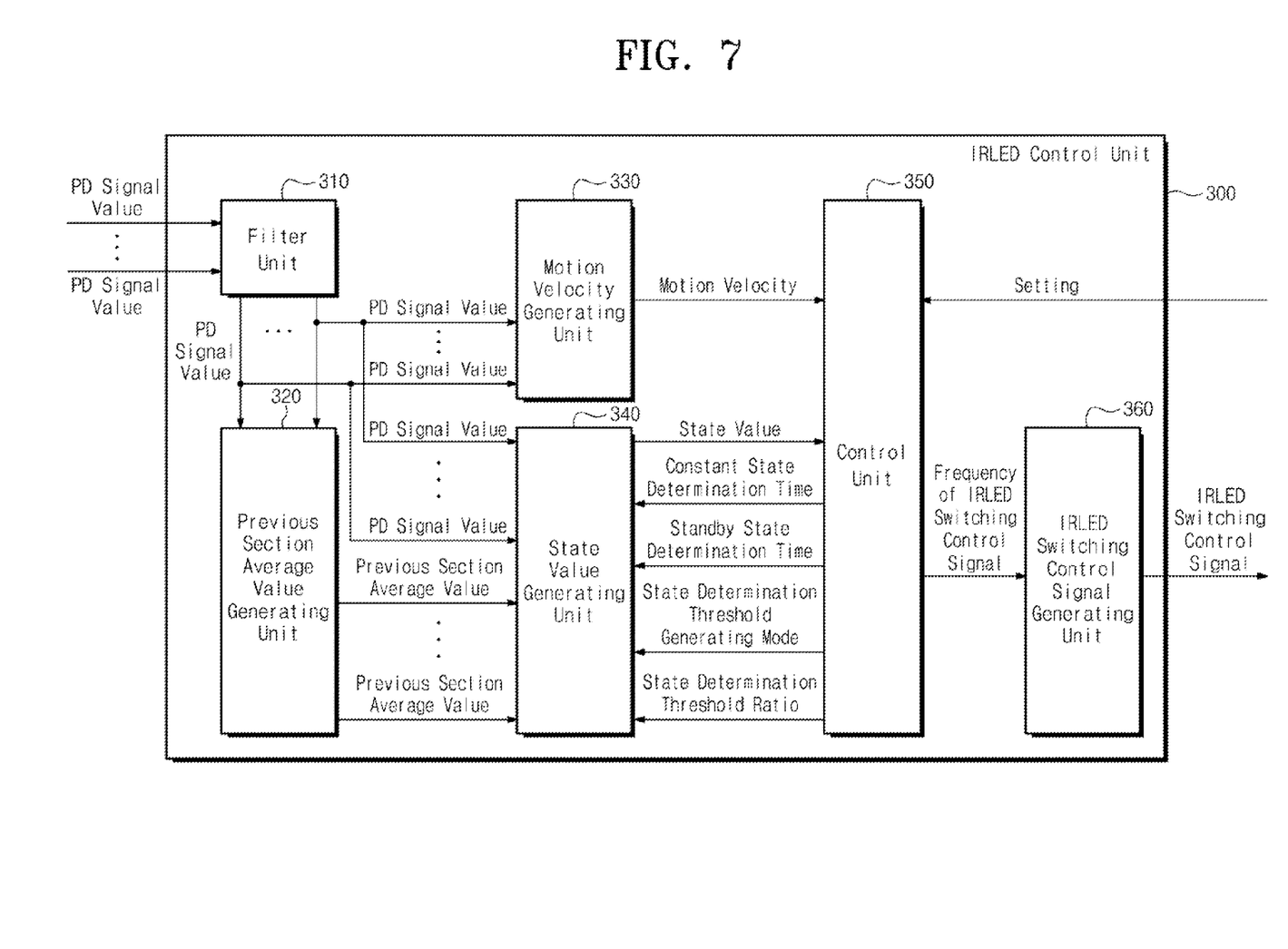
FIG. 7 is an exemplary detailed block diagram of an IRLED control unit of FIG. 1.

FIG. 7 is an exemplary detailed block diagram of the IRLED control unit of FIG. 1.

Referring to FIG. 7, the IRLED control unit 300 may include a filter unit 310, a previous section average value generating unit 320, a motion velocity generating unit 330, a state value generating unit 340, a control unit 350, and a switching control signal generating unit 360.

The motion velocity generating unit 330 receives an input signal that may become a PD signal value, and generates a motion velocity signal of an object. The motion velocity signal is generated by calculating a variation in the PD signal value. There is a characteristic that the variation in the PD signal value increases if the motion velocity of the object increases. The motion velocity signal is generated by using the characteristic.

The filter unit 310 plays a role of removing noise from an input signal.

The previous section average value generating unit 320 compares input signals received in previous sections and generates a previous section average value.

The state value generating unit 340 generates a motion state value for the input signal based on the previous section average value and settings for determination of the motion state of the object.

The control unit 350 applies the settings to the state value generating unit, receives the motion velocity signal and the motion state value and generates a frequency value of a switching control signal.

The switching control signal generating unit 360 generates an LED switching control signal in response to the frequency value of the switching control signal and applies a generated signal to the IRLED driving unit 400 that drives an LED.

The LED switching control signal is a signal adjusted to be optimized for the motion state and velocity of the object as described in FIG. 4.

Figure 8:
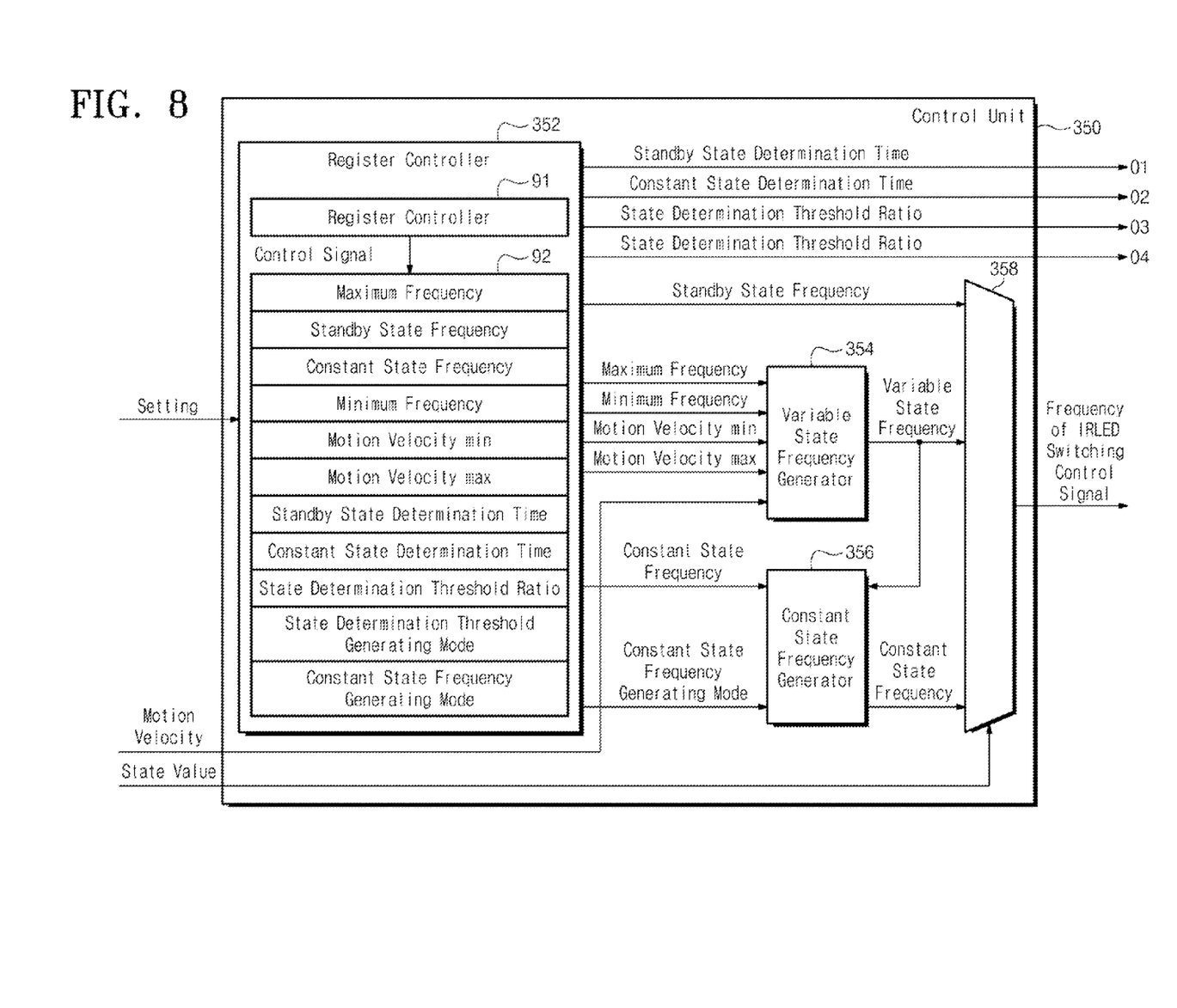
FIG. 8 is an exemplary detailed block diagram of a control unit of FIG. 7.

FIG. 8 is an exemplary detailed block diagram of the control unit of FIG. 7.

Referring to FIG. 8, the control unit 350 includes a setting register unit 352, a variable state frequency generator 354, a constant state frequency generator 356, and a multiplexer 358.

The setting register unit 352 stores frequency information, velocity information, and time information as settings for determination of the motion state of the object. The setting register unit 352 includes a register controller 91 and a register 92 that stores settings in a plurality of storage regions according to the control signal of the register controller 91.

In this example, the settings may include input settings such as maximum frequency, a standby state frequency, a constant state frequency, minimum frequency, minimum motion velocity, maximum motion velocity, a standby state determination time, a constant state determination time, a state determination threshold ratio, a state determination threshold generating mode, and a constant state frequency generating mode.

The variable state frequency generator 354 generates a variable state frequency for the motion velocity of the object according to the frequency information and velocity information applied from the setting register unit 352.

When being in a constant state frequency generating mode, the constant state frequency generator 356 receives frequency information related to a constant state from the setting register unit 352 and generates a constant state frequency. The constant state frequency generator 356 receives the constant state frequency, the constant state frequency generating mode, and the variable state frequency that are input settings, in order to generate the frequency of an IRLED switching control signal to be used in a constant state.

In this example, the constant state frequency generating mode is a mode in which a method of generating a constant state frequency is selected, and is divided into a normal mode and an adaptive mode. When being set to the normal mode, the constant state frequency that is a setting is generated as an output. In the adaptive mode, a constant state frequency proportional to a variable state frequency just before a state value is changed to a constant state is generated as an output. The last output frequency in a variable state reflects the motion velocity of an object. The reason for using the adaptive mode is to reflect the motion velocity of the object even if an IRLED switching frequency is lowered in a constant state. When the motion velocity of the object increases, the constant state becomes short in proportion to a fast velocity. When the constant state changes to the variable sate, a variation in a PD signal value is great. Therefore, if the IRLED switching frequency is too low, it is difficult to accurately detect the motion of the object.

The multiplexer 358 outputs the variable state frequency or the constant state frequency as the frequency value of the switching control signal according to the motion state value. Also, the multiplexer 358 may output the standby state frequency provided from the setting register unit as the frequency value of the switching control signal according to the motion state value.

When generating the switching control signal frequency proportional to the motion velocity of the object, there is a need to consider the maximum velocity of the object, the driving characteristic of an IRLED, and the device characteristic of an analog circuit of a driving unit in an applied system. That is, such characteristics should be reflected when setting the maximum frequency for the switching control signal.

On the other hand, even if the motion velocity of the object is low, there is also a need to set the minimum frequency in order to sense and recognize the object.

Also, the standby state frequency to be used in a standby state may also be set. When an object enters in a standby state in which there is no object, a response time to sense the motion of the object may be slow if the frequency of the switching control signal is too low in the standby state. As a result, since a recognition velocity may decrease, there is also a need to set a frequency in the standby state.

In the constant state, the PD signal value is uniformly maintained similarly to the standby state. Thus, there is no need to perform IRLED switching at a high velocity as in the variable state. However, since the object is moving, there may be a need for a higher frequency than the standby state. If an IRLED switching frequency is lowered in the constant state, consumption power caused by driving an IRLED decreases.

Figure 9:
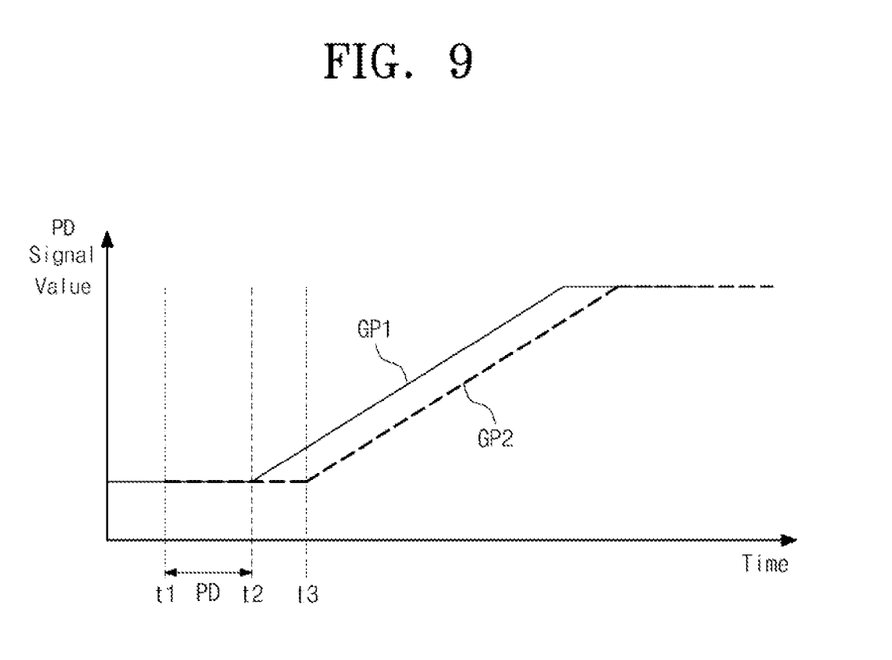
FIG. 9 illustrates the output characteristic approximation of a previous section average value generating unit of FIG. 7.

FIG. 9 illustrates the output characteristic approximation of the previous section average value generating unit of FIG. 7.

In FIG. 9, the horizontal axis represents a time and the vertical axis represents a PD signal value.

The section PD between times t1 and t2 represents a previous section and a time t3 represents the current time. A graph GP1 indicates time vs. PD signal value and a graph GP2 indicates a previous section average value. The previous section average value generating unit 320 approximately generates an average value in the previous section PD before a certain time of the current PD signal value, as in the graph GP2.

Figure 10:
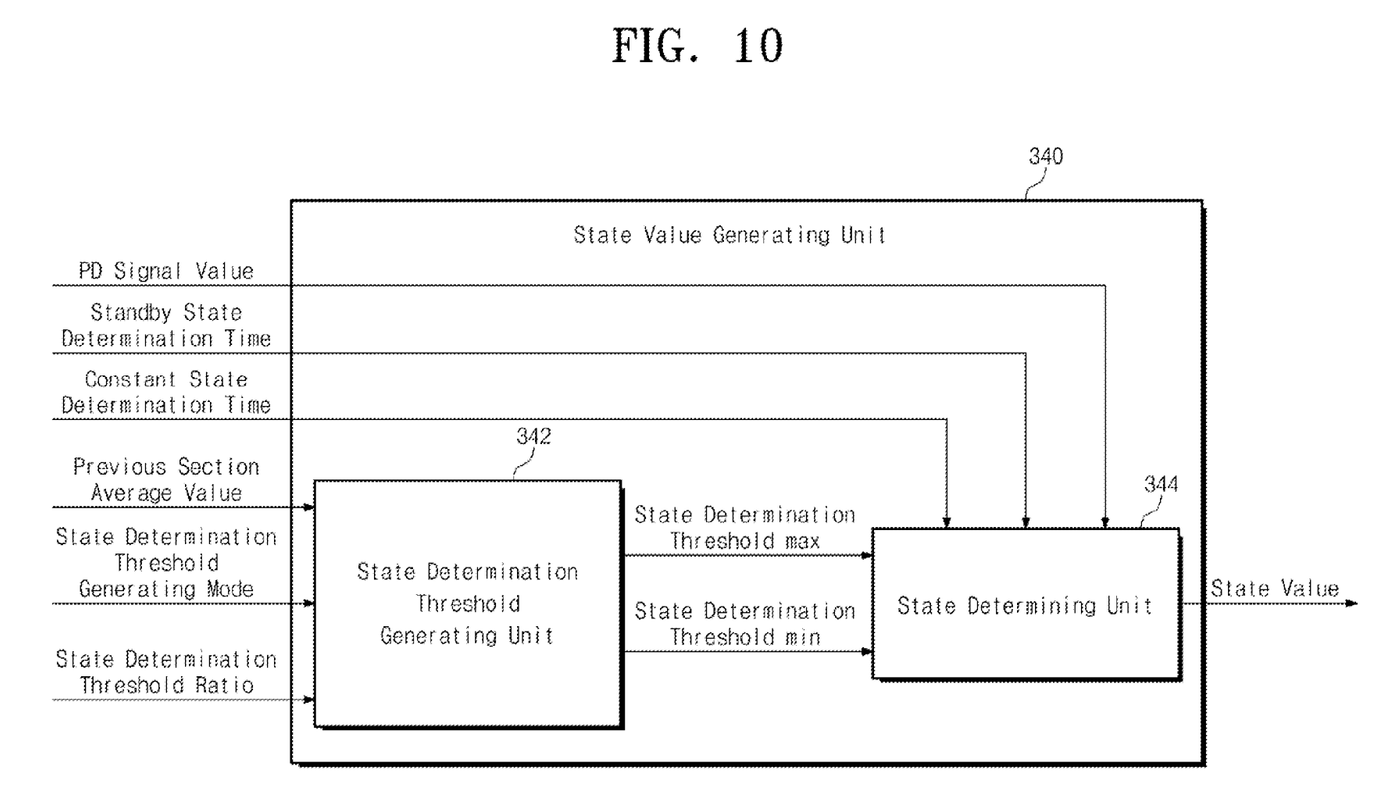
FIG. 10 is an exemplary detailed block diagram of a state value generating unit of FIG. 7.

FIG. 10 is an exemplary detailed block diagram of the state value generating unit of FIG. 7.

Referring to FIG. 10, the state value generating unit 340 may include a state determining unit 344 that determines the motion state of an object, and a state determination threshold generating unit 342 that generates a state determination threshold max and a state determination threshold min that are required for determining a state. The state determination threshold generating unit 342 receives a previous section average value. Also, the state determination threshold generating unit 342 receives a state determination threshold ratio and a state determination threshold generating mode that are stored in the setting register unit 352 of the control unit 350.

The state determination threshold generating mode is divided into a normal mode and an adaptive mode. That is, the state determination threshold generating mode is a signal to select one of two methods of generating the state determination thresholds max and min. First, in the normal mode, a value obtained by multiplying a previous section average value by the state determination threshold ratio is calculated as a variation value. The state determination threshold max is generated by adding the fluctuation value to the previous section average value and the state determination threshold min is generated by subtracting the fluctuation value therefrom.

Second, in the adaptive mode, a fluctuation value is calculated by multiplying a value obtained by subtracting the previous section average value from a maximum PD signal value that may be output, by the state determination threshold ratio. In the same way as the normal mode, the state determination threshold max is generated by adding the fluctuation value to the previous section average value and the state determination threshold min is generated by subtracting the fluctuation value therefrom. In this example, the reason for using the adaptive mode is to be insensitive to a variation in small PD signal value by increasing the width of the state determination thresholds max and min when the PD signal value is in a low state, and to be sensitive to a variation in relatively small PD signal value by decreasing the width of the state determination thresholds max and min when the PD signal value is in a high state.

The state determining unit 344 receives, as inputs, the PD signal value, the state determination thresholds max and min, the constant state determination time, and the standby state determination time stored in the setting register unit of the control unit. The constant state determination time may be set to be more considerable than the standby state determination time. State values that are the outputs of the state determining unit may have three values: a standby state value, a constant sate value, and a variable state value. The state determining unit 344 uses the input values to determine a state value.

If the PD signal value is maintained within a range of the state determination thresholds max and min for a time longer than the standby state determination time, a time since then is determined as a standby state.

If the PD signal value is maintained within a range of the state determination thresholds max and min for a time longer than the constant state determination time, the following time is determined as a constant state.

If the PD signal value leaves a range of the state determination thresholds max and min or is not in the constant state and the standby state, the state is determined as the variable state.

That is, the standby state represents a state in which there is no object reflected or an object does not move for a long time. The variable state represents a state in which the object moves and the PD signal value varies, and the constant state represents a state in which the object is wholly or partially within the light-emitting range of the IRLED and IR radiation is uniformly maintained as in the case ③ of FIG. 5. Also, even if the object completely leaves the light-emitting range of the IRLED, the state is determined as the constant state before being determined as the standby state.

Figure 11:
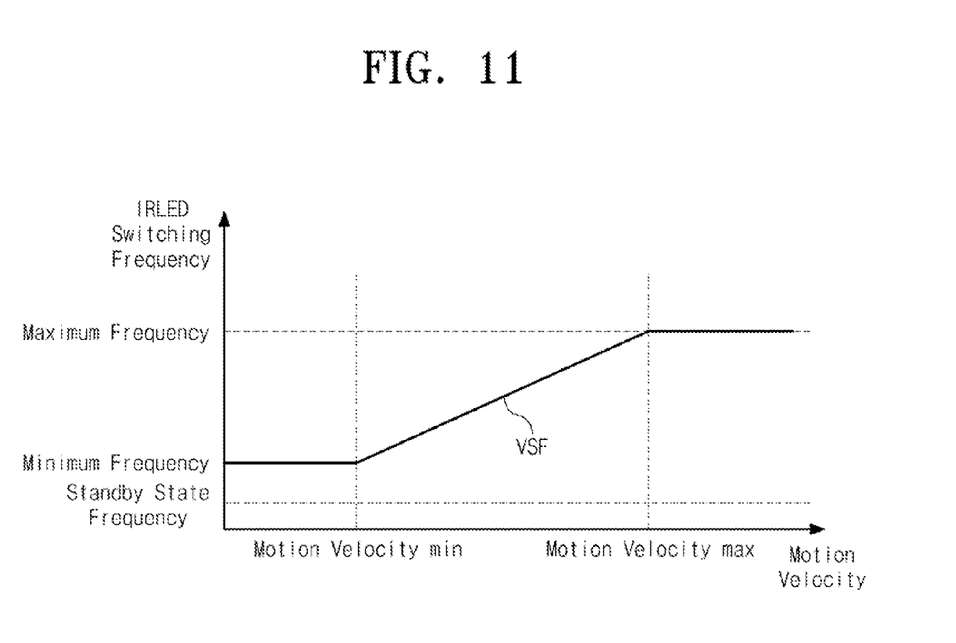
FIG. 11 is an exemplary graph of the operation characteristic of a variable state frequency generator of FIG. 8.

FIG. 11 is an exemplary graph of the operation characteristic of the variable state frequency generator of FIG. 8.

The variable state frequency generator 354 shown in FIG. 8 generates the frequency of an IRLED switching control signal to be used in a variable state. The variable state frequency generator 354 receives, as inputs, settings such as maximum frequency, minimum frequency, a motion velocity min, and a motion velocity max. Also, the variable state frequency generator 354 receives a motion velocity output from the motion velocity generating unit 330 of FIG. 7. The variable state frequency generator 354 outputs the minimum frequency when an input motion velocity is below the motion velocity min, and outputs the maximum frequency when over the motion velocity max. The variable state frequency generator 354 generates a frequency proportional to a motion velocity along with a graph VSF having a slope when between the motion velocity min and the motion velocity max.

Figure 12:
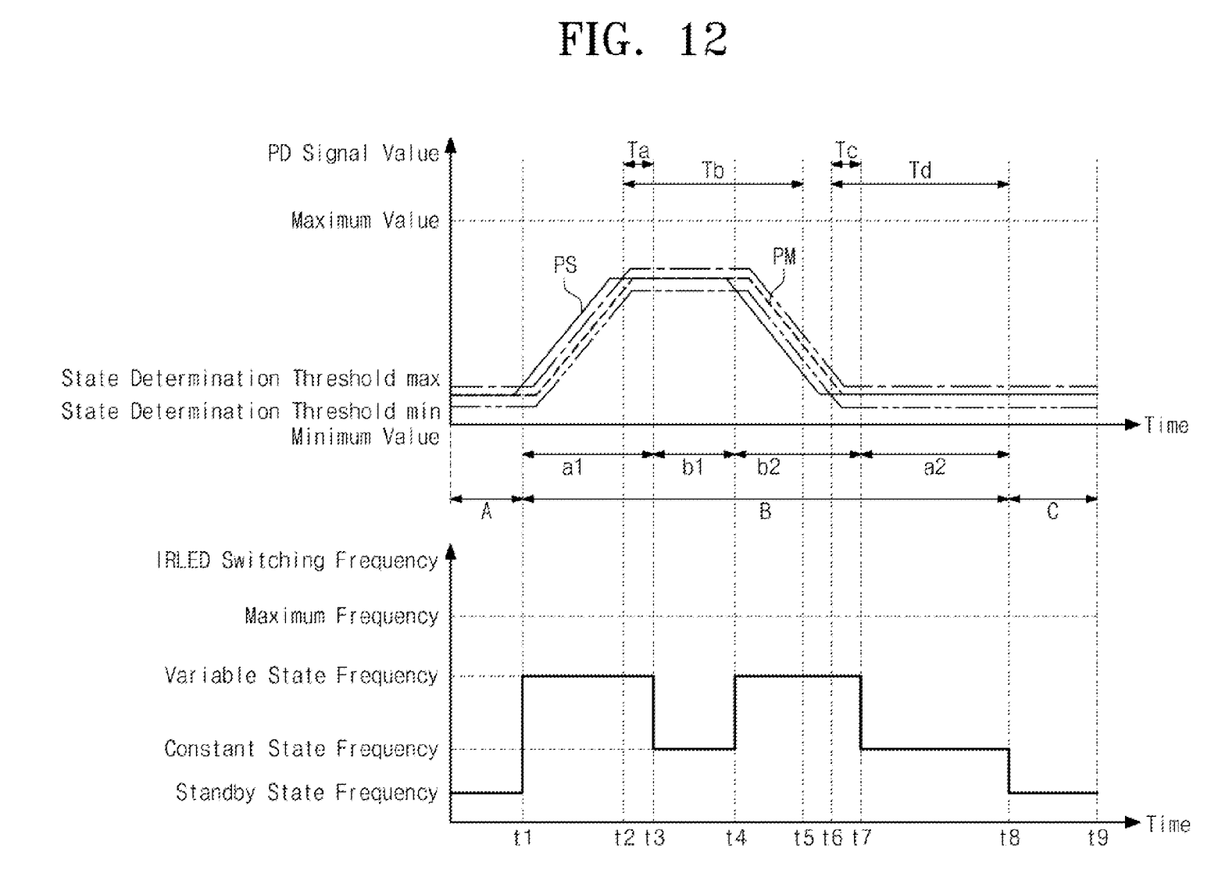
FIG. 12 illustrates graphs approximating a variation in state value and a variation in frequency of a switching control signal according to FIG. 7.

FIG. 12 illustrates graphs approximating a variation in state value and a variation in switching control signal frequency according to FIG. 7.

The graph of FIG. 12 approximates a variation in frequency of an IRLED switching control signal and a variation in state value according to the motion of an object. In the graph shown on the upper part of FIG. 12, the horizontal axis represents a time and the vertical axis represents a PD signal value. In the graph shown on the lower part of FIG. 12, the horizontal axis represents a time and the vertical axis represents the frequency of a switching control signal.

Referring to FIG. 12, a section A represents the standby state of the initial time. The section A means that the state is already determined as a standby state and indicates when there is no entry of an object. In the section A, the PD signal value is maintained as a low value and a previous section average value is also output similarly to the PD signal value. The PD signal value is being maintained within a range of state determination thresholds max and min.

In this case, an output frequency until a time t1 becomes a standby state frequency that is an input setting.

A part a1 of a section B indicates when an object enters the light-emitting range of an IRLED at a constant velocity. In the case of the part a1 of the section B, the PD signal value increases and a variation is constant. In this case, the PD signal value leaves a range of the state determination thresholds max and min and changes from the standby state to a variable state. In such a variable state, a variable state frequency is generated. The motion velocity of an object between times t1 and t2 of FIG. 12 is constant. Thus, the variable state frequency is constant as shown in FIG. 12.

If the object further moves and is partially or wholly included in the light-emitting rang of the IRLED as in the case ③ of FIG. 5, IR radiation is uniformly maintained. In this state, the PD signal value re-enters a range of the state determination thresholds max and min and is uniformly maintained. It corresponds to a part b1 of the section B. In the part b1 of the section B, it is checked whether the PD signal value is maintained within a range between the state determination thresholds max and min for a time longer than the constant state determination time. A state is determined as the constant state if positive, and a constant state frequency is output between times t3 and t4.

If the object further moves and begins to leave the light-emitting range of the IRLED, the PD signal value decreases and leaves a range of the state determination thresholds max and min. That is, in a part b2 of the section B, a state value changes from the constant state back to the variable state. In such a variable state, a variable state frequency is generated between times t4 and t7. In this example, since the motion velocity of the object is constant as in the part a1 of the section B, the variable state frequency is constant as shown in FIG. 12.

If the object further moves and completely leaves the light-emitting range of the IRLED as in a part a2 of the section B, the PD signal value is uniformly maintained and enters a range between the state determination thresholds max and min. As a result, if the PD signal value is maintained within a range between the state determination thresholds max and min for a time longer than the constant state determination time, a state is determined as the constant state again.

If the object does not re-enter the light-emitting range of the IRLED and thus the PD signal value is maintained within a range between the state determination thresholds max and min for a time longer than the standby state determination time as in a section C, a state changes from the constant state to the standby state. In this case, a standby state frequency is generated.

In FIG. 12, reference signs Ta, Tb, Tc, and Td indicate a constant state determination time, a standby state determination time, a constant state determination time, and a standby state determination time, respectively. Also, reference signs PS and PM indicate a PD signal value and a previous section average value, respectively.

Figure 13:
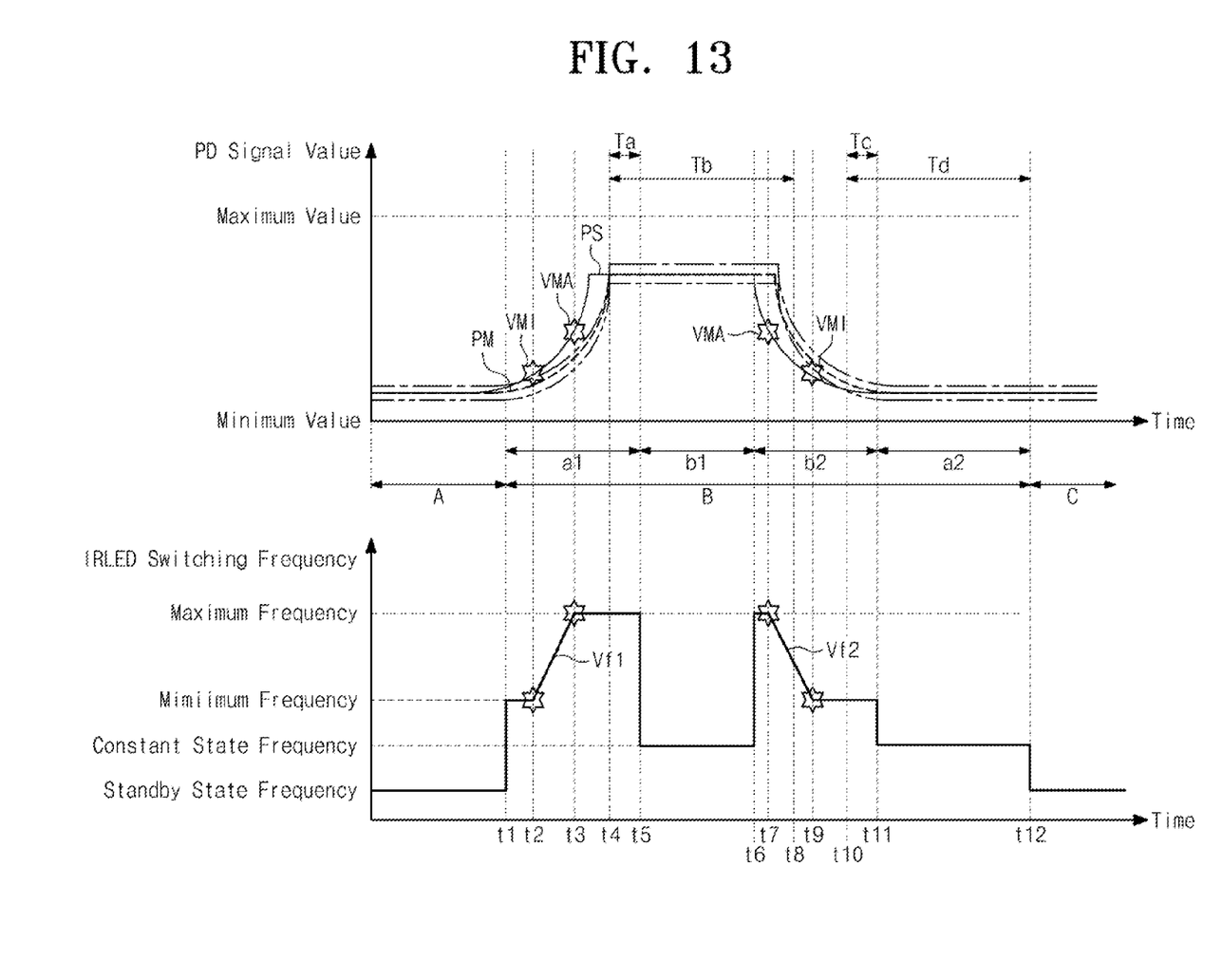
FIG. 13 illustrates graphs approximating another variation in state value and another variation in frequency of a switching control signal according to FIG. 7.

FIG. 13 illustrates graphs approximating another variation in state value and another variation in frequency of a switching control signal according to FIG. 7.

FIG. 13 is the same as FIG. 12 except that the motion velocity of an object is not constant but increases.

In the graph shown on the upper part of FIG. 13, the horizontal axis represents a time and the vertical axis represents a PD signal value. In the graph shown on the lower part of FIG. 13, the horizontal axis represents a time and the vertical axis represents the frequency of a switching control signal.

Referring to FIG. 13, if the motion velocity of the object increases, a frequency increases in proportion to the velocity. Also, even if the motion velocity is constant, a variation in the PD signal value may also increase by the operation characteristic of a PD device and the geometric arrangement of an IRLED and a PD.

For example, a variation in the PD signal value is faster detected between times t2 and t3 of FIG. 13.

When a state changes from the initial standby state to a variable state at a time t1, the minimum frequency that is an input setting is output if the motion velocity of the object is lower than a motion velocity min that is a setting.

When the motion velocity increases at a time t2 and becomes higher than the motion velocity min, a frequency proportional to the motion velocity is output until a time t3 as in FIG. 11.

When the motion velocity gradually increases at a time t3 and reaches a motion velocity max, the maximum frequency is output. Even if the velocity further increases after the time t3, the maximum frequency is output until a time t5.

At the time t5, when a motion state changes from the variable state to a constant state, a constant state frequency is output until a time t6.

At the time t6, when the motion state changes from the constant state back to the variable state, the maximum frequency is output because the motion velocity is higher than the motion velocity max at the initial stage of operation. Since the motion velocity decreases since then, a frequency lower than the maximum frequency is also output. At a time t9, when the motion velocity is lower than the motion velocity min, the minimum frequency is output. The graphs of FIG. 13 represent generating an output frequency as in FIG. 12 except for section graphs VF1 and VF2.

According to the present invention, since the frequency of the IRLED switching control signal is controlled to be suitable for the motion state and motion velocity of an object, precision in sensing and recognition is enhanced and consumption power of the IRLED is minimized or decrease.

While particular embodiments have been described in the detailed description of the present invention, several variations may be made without departing from the scope of the present invention. Therefore, the scope of the present invention should not be limited to the above-described embodiments but be defined by the following claims and equivalents thereof.

What is claimed is:

1. An apparatus for controlling the driving of a light-emitting diode (LED), the apparatus comprising:
    a motion velocity generating unit receiving an input signal to generate a motion velocity signal;
    a previous section average value generating unit comparing input signals received in previous sections to generate a previous section average value;
    a state value generating unit generating a motion state value for the input signal based on the previous section average value and settings for determination of a motion state of the object;
    a control unit applying the settings to the state value generating unit, wherein the control unit receives the motion velocity signal and the motion state value and generates a frequency value of a switching control signal; and
    an LED switching control signal generating unit generating an LED switching control signal in response to the frequency value of the switching control signal, wherein the LED switching control signal generating unit applies a generated signal to a driving unit driving an LED.

2. The apparatus of claim 1, wherein the input signal is one or more photodiode (PD) signals.

3. The apparatus of claim 1, wherein the control unit comprises:
    a setting register unit storing frequency information, velocity information, and time information as settings for determination of the motion state of the object;
    a variable state frequency generator generating a variable state frequency for the motion velocity of the object according to the frequency information and the velocity information applied from the setting register unit;
    a constant state frequency generator receiving frequency information related to a constant state from the setting register unit in a constant state frequency generating mode and generating a constant state frequency; and
    a multiplexer outputting the variable state frequency or the constant state frequency as the frequency value of the switching control signal according to the motion state value.

4. The apparatus of claim 3, wherein the multiplexer further outputs a standby state frequency provided from the setting register unit as the frequency value of the switching control signal according to the motion state value.

5. The apparatus of claim 3, wherein the state value generating unit comprises:

a state determination threshold generating unit receiving the previous section average value applied from the previous section average value generating unit and a state determination threshold ratio applied from the control unit in a state determination threshold generating mode and generating maximum and minimum state determination thresholds; and a state determination unit determining a motion state on the input signal with reference to the time information and minimum state determination threshold applied from the control unit and generating a corresponding motion state value.

6. The apparatus of claim 1, further comprising a filter unit removing noise from the input signal, wherein the filter unit is installed before the motion velocity generating unit and the previous section average value generating unit.

7. The apparatus of claim 1, wherein the LED switching control signal has different ON/OFF periods in a standby state and a motion sensing state.

8. The apparatus of claim 7, wherein the ON/OFF period in the motion sensing state is shorter than the ON/OFF period in the standby state.

9. The apparatus of claim 8, wherein the ON/OFF period in the motion sensing state varies depending on a motion state of the object.

10. A method of providing a signal for controlling the driving of an LED, the method comprising:

receiving an input signal, generating a motion velocity signal of an object, comparing input signals received in previous sections and generating a previous section average value;

generating a motion state value for the input signal according to the previous section average value and settings for determination of a motion state of the object;

using the motion velocity signal and the motion state value to generate a frequency value of a switching control signal;

generating an LED switching control signal according to the frequency value of the switching control signal and applying a generated signal to an LED driving unit.

11. The method of claim 10, wherein the input signal is a signal received through a plurality of PDs.

12. The method of claim 10, further comprising filtering noise out of the input signal before generating the motion state value.

13. The method of claim 10, wherein the LED switching control signal has different frequencies in a standby state and a motion sensing state.

14. The method of claim 13, wherein a frequency in the motion sensing state is higher than a frequency in the standby state.

15. The method of claim 13, wherein a frequency in the motion sensing state varies depending on a motion state of the object.

16. The method of claim 13, wherein the settings comprise frequency information, velocity information, and time information.

\* \* \* \* \*